WILLIAM F. MUELLER
CARL F. RUST
INVENTORS

BY Frederick E. Dumoulin
ATTORNEY

Aug. 6, 1957  W. F. MUELLER ET AL  2,802,172
CORE SAMPLE RESISTIVITY CELL
Filed July 16, 1953  2 Sheets-Sheet 2

WILLIAM F. MUELLER
CARL F. RUST
INVENTORS

BY Frederick E. Dumoulin
ATTORNEY

United States Patent Office 2,802,172
Patented Aug. 6, 1957

2,802,172

CORE SAMPLE RESISTIVITY CELL

William F. Mueller and Carl F. Rust, Dallas, Tex., assignors, by mesne assignments, to Socony Mobil Oil Company, Inc., a corporation of New York Application July 16, 1953, Serial No. 368,464

7 Claims. (Cl. 324—13)

This invention relates to the measurement of electrical resistivity of core samples taken from subterranean formations and relates more particularly to a cell for use in the measurement of electrical resistivity of such core samples.

In the drilling of wells, such as oil or gas wells, cores are taken of the earth strata through which the wells are drilled and various characteristics of the cores or core samples are determined for the purpose of establishing the lithologic structure of the strata, estimating the quantity of fluid in the strata, the ease of flow through the strata, etc. Such core samples are also taken from producing strata and characteristics of the core samples are determined for the purpose of estimating fluid reserves, predicting production rates, etc. Among the characteristics of core samples commonly determined is the formation resistivity factor involving measurement of the electrical resistivity of the core samples.

It is an object of this invention to provide an apparatus for use in the measurement of electrical resistivity of core samples. It is another object of this invention to provide an apparatus wherein the electrical resistivity of a core sample may be measured by the two-electrode and by the four-electrode method. It is another object of this invention to provide an apparatus wherein the water content of a core sample may be maintained substantially constant during measurement of its electrical resistivity. These and other objects of the invention will become apparent from the following detailed description thereof.

Figure 1:
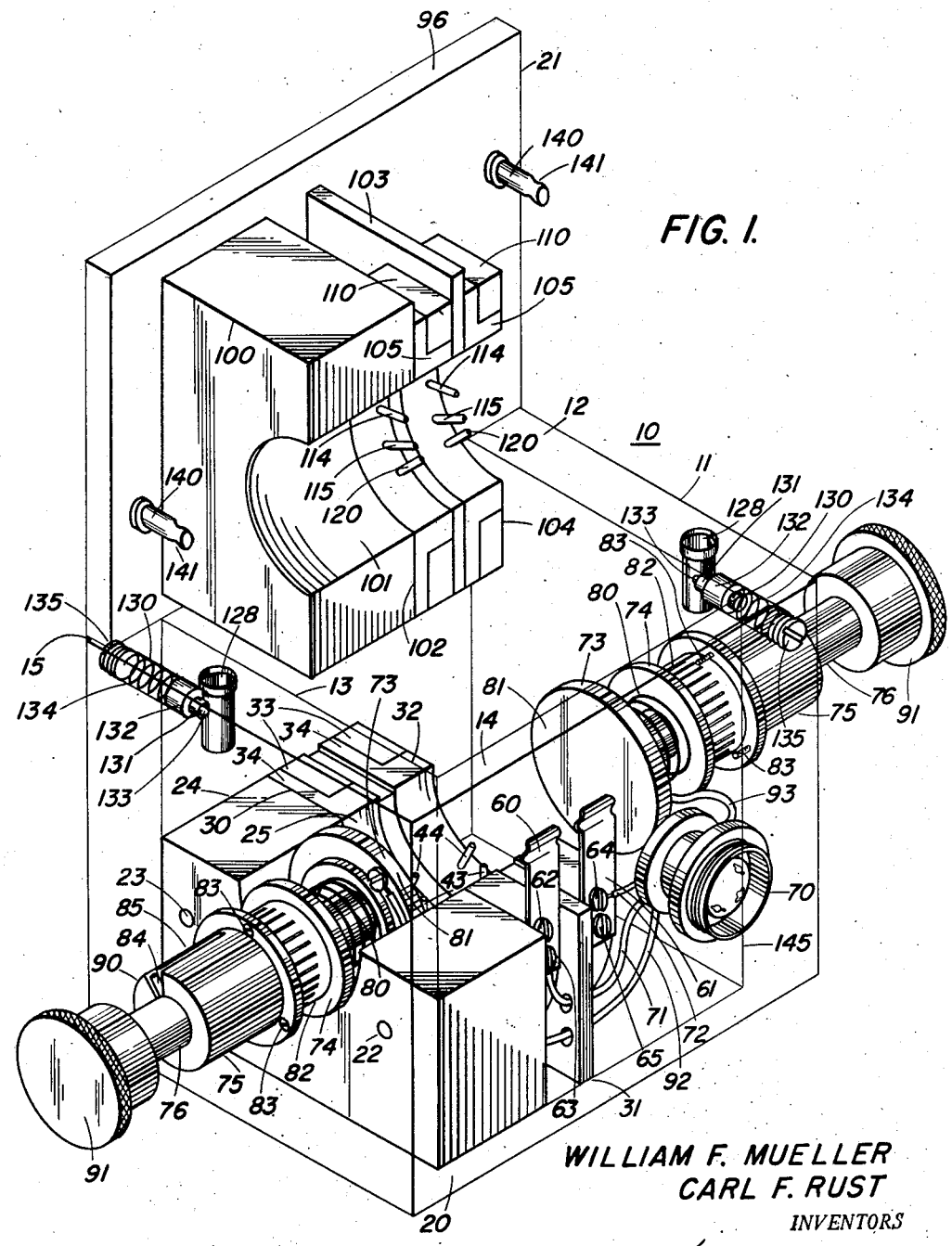
Figure 1 is an isometric view of a core sample cell constructed in accordance with an embodiment of the invention, the cover thereof being shown in an open position.

Referring to the drawings, the cell, indicated generally by the numeral 10, comprises box 11 having side walls 12, 13, 14, and 15, bottom wall 20, and cover 21. The side and bottom walls and the cover may be constructed of any suitable material. However, a plastic such as methyl methacrylate has been found to be satisfactory and the cell, as illustrated in Figure 1, is constructed of such plastic material, which plastic material is transparent and is electrically non-conductive.

Affixed to side wall 13 by means of screws 22 and 23 and contacting the bottom wall 20 is block member 24 which may be constructed of the same material as the side and bottom walls and the cover of the cell. The block member is formed to provide a portion of a channel 25 at the upper surface thereof. The shape of the cross section of the channel should conform to the shape of the surface of the cross section of the core sample, bisected longitudinally, whose resistivity is to be measured. Generally, core samples are in the form of cylinders and therefore the channel is preferably formed to have a semi-circular cross section. Affixed to the block member 24 at the side opposite the side contacting the wall 13 is electrode holder 30. Affixed to the side of electrode holder 30 at the side opposite the side contacting the block member 24 is insulating member 31 and affixed to the side of insulating member 31 opposite the side contacting the electrode holder 30 is electrode holder 32.

Electrode holders 30 and 32 are similar in construction. Each electrode holder is constructed of two electrically conducting members 33 and 34, member 33 being provided with a plurality of electrode wells 35, 40, and 41, and electrodes 42, 43, and 44, respectively, are contained within each well. Each electrode penetrates through a port 45 in the member 34 and extends radially therefrom, and each electrode is provided with a fixedly attached collar 50 having a diameter greater than the diameter of the ports 45 whereby motion of the electrodes outwardly from the wells through the ports is restricted. Each electrode is preferably rounded at the point protruding from the member 34 and the point is preferably coated with silver. A helical spring 51 surrounds each electrode at the portion within the well and the spring bears against the collar 50 to provide tension against the electrode when displaced in the direction moving the collar away from the member 34. Each spring is electrically connected to the member 33 and to the collar 50. Two wells 52 (one of which is shown) are provided in the bottom wall 20 to receive the end of each of electrodes 43 when displaced toward the bottom wall and thereby permit movement of the electrode without interference from the bottom wall. Electrically insulated screws 53, 54, and 55 serve to hold members 33 and 34 tightly against each other and to maintain the electrode holders and the insulating member 31 tightly against block member 24. Each of electrode holders 30 and 32 and insulating member 31 are shaped at the upper surface thereof to provide the continuation of channel 25 having a semi-circular cross-section.

Affixed to each of electrode holders 30 and 32 are spring contactors 60 and 61, respectively. Electrically conducting screws 62 and 63 serve to affix spring contactor 60 to electrode holder 30 and electrically conducting screws 64 and 65 serve to affix spring contactor 61 to electrode holder 32. A four-pole electrical plug 70 is affixed to and leads through the side wall 14 of the cell. Insulated conductor 71 leads from one of the poles of plug 70 and is connected with screw 63. Insulated conductor 72 leads from another of the poles of plug 70 and is connected to screw 64.

Leading through each of side walls 12 and 13 is a spring-loaded electrode 73. The electrodes comprise a collar 74, a sleeve 75, a shaft 76, a helical spring 80, and a core contacting plate 81. The collar 74 is press-fitted into an opening 82 in the wall and tightly contacts the wall. The sleeve 75 is affixed to the wall by means of a plurality of screws 83. The shaft 76 passes through the collar 74 and the sleeve 75 and is connected to the core contacting plate, the connection being a swivel connection, if desired. The helical spring 80 surrounds the shaft at the portion thereof between the collar 74 and the core contacting plate 81 and bears against the collar 74 and the core contacting plate 81. The shaft 76 is provided with a pin 84 fixedly attached thereto and receivable within a key-way 85 and key stop 90 formed in the sleeve 75. A handle 91 is fixedly attached to the end of the shaft. Insulated conductor 92 leads from a third of the poles of plug 70 and is electrically connected to one of core contacting plates 81. Insulated conductor 93 leads from the fourth of the poles of plug 70 and is electrically connected to the other core contacting plate 81.

Cover 21 comprises cover plate 96 having a handle 97 attached thereto. Attached to the under side of the cover plate 96 is block member 100 affixed thereto by means of screws (not shown). The block member is formed to provide a portion of a channel 101 at the bottom surface thereof and the channel is preferably formed to have a semi-circular cross-section, similarly as channel 25. Affixed to the block member 100 at one side thereof is electrode holder 102. Affixed to the side of the electrode holder 102 at the side opposite the side contacting the block member 100 is insulating member 103, and affixed to the side of the insulating member 103 opposite the side contacting the electrode holder 102 is electrode holder 104.

Electrode holders 102 and 104 are similar in construction. Each electrode holder is constructed of two electrically conducting members 105 and 110, member 110 being provided with a plurality of electrode wells 111, 112, and 113 and electrodes 114, 115, and 120, respectively, are contained within each well. Each electrode penetrates through a port 121 in the member 105 and extends radially therefrom, and each electrode is provided with a fixedly attached collar 122 having a diameter greater than the diameter of the ports 121 whereby motion of the electrodes outwardly from the wells through the ports is restricted. Each electrode is preferably rounded at the point protruding from the member 105 and the point is preferably coated with silver. A helical spring 123 surrounds each electrode at the portion within the well and the spring bears against the collar 122 to provide tension against the electrode when displaced in the direction moving the collar away from the member 105. Each spring is electrically connected to the member 110 and the collar 122. Two wells 124 (one of which is shown) are provided in the cover plate 96 to receive the end of each of electrodes 115 when displaced toward the cover plate 96 and thereby permit movement of the electrode without interference from the cover plate. Electrically insulated screws 125, 126, and 127 serve to hold members 105 and 110 tightly against each other and to maintain the electrode holders and the insulating member 103 tightly against block member 100. Each of electrode holders 102 and 104 and insulating member 103 are shaped at the bottom surface thereof to provide the continuation of channel 101 having a semi-circular cross-section.

Figure 2:
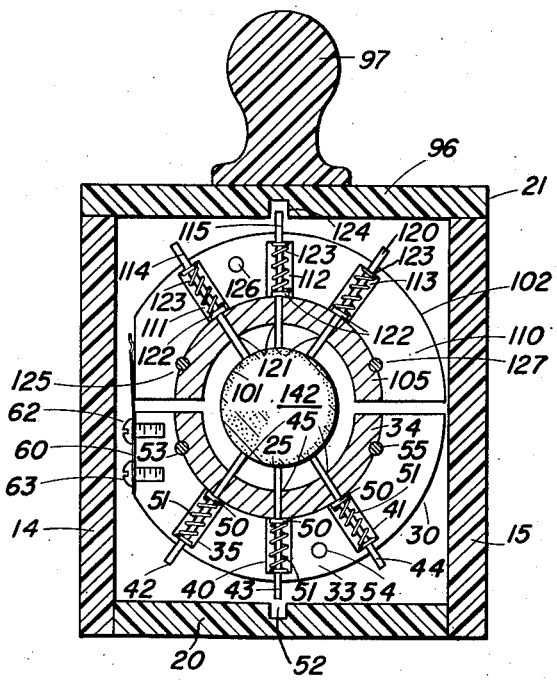
Figure 2 is a view in section of the core sample cell of Figure 1 through an electrode holder thereof, the cover being shown in its closed position and a core sample being shown in position for measurement of its electrical resistivity.

In Figure 1, the cover 21 is shown in a position resting edgewise against the top of wall 15. However, this position of the cover 21 is merely for purposes of illustration. The cover may be lifted from the bottom portion of the cell comprising the four side walls and the bottom wall, as desired. In operation of the cell, the cover is positioned as shown in Figure 2.

Walls 12 and 13 are each provided with a pin-receiving chamber 128. Leading to each of the pin-receiving chambers is a spring chamber 130 having a throat 131 at the point thereof immediately next to the pin-receiving chamber 128. Each spring chamber contains a bushing 132 having a nipple 133 attached thereto, the nipple being capable of penetrating the throat 131 and entering the pin-receiving chamber 128. Bearing against each of bushings 132 is a helical spring 134 retained within the chambers 130 by means of threaded caps 135. Attached to cover plate 96 are pins 140 having a groove 141 formed therein and adapted to be received within the pin-receiving chamber 128 and to be held in position therein by means of the nipples 133 bearing against the grooves 141. The cover plate 96 and the portion of the side walls 12, 13, 14, and 15 contacting the cover plate when the cover is positioned thereon are machined to provide a fit which is substantially fluid tight.

The pins 140, the pin-receiving chambers, and the block member 100 are so positioned that, with the cover 21 on the box 11, the electrodes of electrode holder 30 and the electrodes of electrode holder 102 are in the same plane and the electrodes of electrode holder 32 and the electrodes of electrode holder 104 are in the same plane, the two planes being parallel to each other.

The side walls 12, 13, 14, and 15 are in fluid tight contact with each other and the bottom wall 20 is in fluid tight contact with the side walls 12, 13, 14, and 15. The plug 70 is affixed in fluid tight relationship with the wall 14 and the collars 74 and the sleeves 75 are affixed in fluid tight relationship with the walls 13 and 12. Further, the cover 21, as stated above, is machined to provide a substantially fluid tight fit with the side walls 12, 13, 14, and 15. Accordingly, the box forms a fluid tight receptacle and a container (not shown) may be placed within the chamber 145 comprising the portion of the box along the bottom wall 20 thereof between the insulating member 31 and the wall 12 and between the walls 14 and 15.

Formation resistivity factor, as determined from a core sample taken from the formation, is the ratio of the resistivity of the core sample when saturated with brine to the resistivity of the brine. To determine the formation resistivity factor, accordingly, the core sample is first saturated with brine and the resistivity of the brine saturated core sample is measured. The resistivity of the brine is also measured, or it may be determined from the concentration of the salts in the brine if known, and the formation resistivity factor is then calculated from these two values.

In determining the resistivity of the core sample, the core sample is first treated to remove oil or other liquid material contained therein. This may be accomplished by extracting the core sample with a suitable solvent such as acetone, benzene, toluene, etc., and the extraction may be carried out in a Soxhlet extractor or other suitable type of apparatus. Following extraction, the core sample is thoroughly dried of all solvent as, for example, by heating in a drying oven at about 100 degrees C.

The dried core sample is then saturated with brine. It is usually desirable to obtain complete saturation of the sample and, in order to obtain practically complete saturation, it is preferred to remove first the air from the core sample. This may be effected simply by subjecting the core sample to a reduced pressure in a suitable type of evacuator. Thereafter, the core sample may be saturated at higher pressure with an inert water-soluble gas such as carbon dioxide. This procedure of evacuating followed by saturating with an inert water-soluble gas may be repeated as often as necessary to insure the removal and replacement of the maximum amount of air practically obtainable. Usually, three cycles will be satisfactory. The gas saturated core sample is evacuated once again and, while under the reduced pressure, brine is admitted thereto. The water-soluble gas remaining in the core sample dissolves in the brine thereby effecting a satisfactorily complete saturation. Saturation of the core sample may also be effected by subjecting the core sample to a reduced pressure in a suitable type of evacuator and while maintaining the core sample at the reduced pressure admitting the brine thereto, the brine previously having been de-aerated, as by boiling.

For saturating the core sample, a brine consisting of sodium chloride and water is satisfactory. The sodium chloride content of the brine may be between 1,000 and 100,000 parts per million although higher and lower sodium chloride content may be employed as desired. A brine having a sodium chloride content of 50,000 parts per million gives satisfactory results. Where comparison of the resistivity of a plurality of core samples is made, the same type of brine is employed for saturating each core sample.

Measurement of the resistivity of the core sample involves passing a known electrical current through the core sample and determining a resulting potential drop.

Knowing the value of the current and the potential drop, the resistance at the existing temperature is obtained by application of Ohm's law. With the resistance determined, the resistivity can be calculated from the geometry of the core sample by the relationship $$\rho = \frac{RA}{L}$$

where $\rho$ is the resistivity of the core sample, R is the measured resistance between the electrodes employed for measuring the potential drop, A is the cross-sectional area of the core sample, and L is the distance between the electrodes employed for measuring the potential drop.

In measuring the resistivity of a core sample employing the resistivity cell of the invention, the cover 21 is removed from the box 11 and the shafts 76 are pulled outwardly and turned so as to position pins 84 against the key stops 90 whereby the shafts are maintained in a separated position. The core sample 142, which is usually of cylindrical form, is placed within the channel 25 to contact the electrodes 42, 43, and 44 of electrode holder 30 and electrode holder 32. The shafts are then turned to move the pins 84 from the key stops 90 and permit the core contacting plates 81 to contact the two opposite edges of the core. Preferably, the core contacting plates 81 are covered with chamois or other suitable material saturated with brine prior to contacting with the core sample whereby good electrical contact between the core sample and the plates is assured. A container holding fluid, the fluid comprising the same type of brine employed for saturating the core sample 142, is then placed in the chamber 145 whereby the atmosphere within the cell will become saturated with respect to water and prevent evaporation of water from the core sample. The cover 21 is then placed upon the box 11, the pins 140 being received into the pin-receiving chambers 128. The upper portion of the core sample is received within the channel 101 of the cover and the electrodes 114, 115, and 120 of electrode holder 102 and electrode holder 104 contact the core sample. Spring contactor 60 contacts electrode holder 102 and spring contactor 61 contacts electrode holder 104. Accordingly, any potential imposed upon the electrodes in electrode holder 30 will be imposed upon the electrodes in electrode holder 102 and any potential imposed upon the electrodes in electrode holder 32 will be imposed upon the electrodes in electrode holder 104. Thus, the electrodes in electrode holders 30 and 102 comprise in effect one electrode and the electrodes in electrode holders 32 and 104 comprise in effect a second electrode. Each of the electrodes 42, 43, 44, 114, 115, and 120, being provided with springs, force themselves against the outer surface of the core sample and make a tight electrical contact therewith. Further, since a plurality of electrodes are employed, the effects of any radial variation in properties of the core samples on the resistivities thereof are minimized. Also, the springs 80 force the core contacting plates 81 in tight electrical contact with the ends of the core sample.

A particular feature of the resistivity cell of the invention resides in the fact that it may be employed for measuring the resistivity of the core sample by either the two-electrode method or the four-electrode method. In the two-electrode method, an electrical current of known magnitude is passed through the core sample between the core contacting plates 81 and the potential drop across the core sample between the plates is measured. In the four-electrode technique, current is passed through the core sample between the core contacting plates 81 which act as current electrodes and the potential drop is measured between the electrodes contained in electrode holders 30 and 102 on the one hand and electrode holders 32 and 104 on the other hand, the electrodes in electrode holders 30 and 102 acting as one potential electrode and the electrodes in electrode holders 32 and 104 acting as the other potential electrode.

Figure 3:
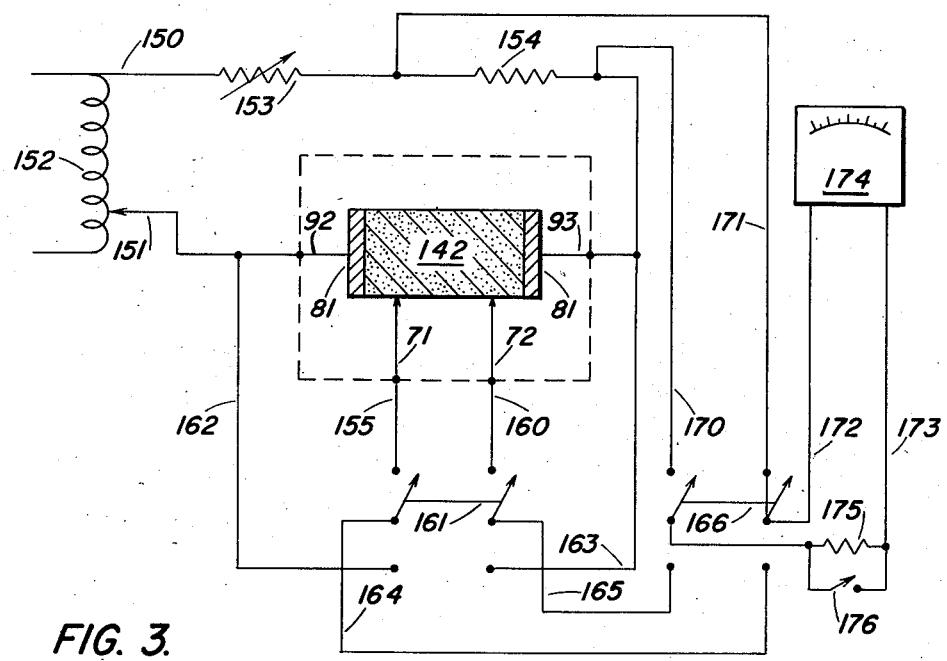
Figure 3 is a circuit diagram illustrating a method of measuring the resistivity of a core sample using the cell of Figure 1.

Referring to Figure 3 which is a diagram of the circuit which may be employed in connection with the resistivity cell of the invention, conductors 150 and 151 are connected to a source 152 of alternating current. Conductor 150 contains variable resistor 153 and known fixed resistor 154 and is connected to the pole of plug 70 to which conductor 93 is connected. Conductor 151 is connected to the pole of plug 70 to which conductor 92 is connected. Conductor 155 is connected to the pole of plug 70 to which conductor 71 is connected and conductor 160 leads to the pole of plug 70 to which conductor 72 is connected.

Conductors 155 and 160, connected to the poles of plug 70 to which conductors 71 and 72 respectively are connected, lead to double-pole, double-throw switch 161. Conductor 162 leads from switch 161 to conductor 151 and conductor 163 leads from switch 160 to conductor 150. The center taps of switch 160 are connected to conductors 164 and 165, respectively, which lead to double-pole, double-throw switch 166. Conductors 170 and 171 lead from switch 166 and are connected to conductor 150 across fixed resistor 154. The center taps of switch 166 are connected to conductors 172 and 173, respectively, leading to voltmeter 174. A resistor 175 having the same impedance as the voltmeter 174 is connected in series with the voltmeter and a switch 176 is connected across the resistor 175.

To measure the conductivity across the core sample 142 by the two-electrode method, switch 161 is opened and switch 166 is closed to its upper position to connect conductors 170 and 171 to the voltmeter 174. Switch 176 is also closed. Current from source 152 is then passed through the circuit thus formed, the circuit consisting of conductor 150, variable resistor 153, fixed known resistor 154, conductor 93, core contacting plate 81, core sample 142, the other core contacting plate 81, conductor 92, and conductor 151. The value of resistor 154 being known, variable resistor 153 is adjusted to obtain a desired current through the circuit as measured by voltmeter 174 connected across known fixed resistor 154. Switch 166 is then thrown to its bottom position to connect conductors 164 and 165 to the voltmeter and switch 161 is thrown to its downward position to connect conductors 155 and 160, respectively, to conductors 162 and 163. The voltmeter will now measure the potential drop across the core sample. Knowing the current and the potential drop, the resistance of the core sample is calculated by application of Ohm's law. The value of resistivity can then be calculated from the resistance and geometry of the core sample.

Measurement of the resistivity across the entire core sample may introduce uncertainties as to contact resistances between the core sample and the core contacting plates 81. Further, where the resistivity of core samples having unequal lengths is measured, it may be desired to eliminate measurement of the length of the core samples. In these cases, the resistivity of the core samples may be measured along a portion of their lengths, the portion being the distance between the points of contact of the two sets of potential electrodes, namely, the electrodes in electrode holders 30 and 102 and the electrodes in electrode holders 32 and 104. Resistance of the core sample between the points of contact of the potential electrodes is measured by throwing switch 161 to its upper position to connect conductors 155 and 160 to the voltmeter 174. The reading on the voltmeter will indicate the resistance of the core sample between the points of contact of the electrodes in the same manner as described above for the entire core sample. Contact resistances may exist between the core sample and the electrodes in the electrode holders 30, 32, 102 and 104 which will give rise to error in the measured resistance of the core sample. To determine if such contact resistances exist, switch 176 is closed and if the voltmeter reading does not drop to exactly one-half its previous value, contact resistances exist. If such resistances exist, the electrodes may be cleaned or other measures taken to eliminate the resistances.

While the walls 12, 13, 14, and 20, the cover 21 and the block members 24 and 100 have been described as being formed of electrically non-conductive material, it will be understood that electrically conductive material may be employed. However, in these cases, it will be understood that proper insulation must be provided between the walls and the electrodes 73 and the walls and the electrodes in the electrode holders 30 and 102 and the walls and the electrodes in the electrode holders 32 and 104. These and other variations may be readily made by those skilled in the art.

Having thus described our invention, it will be understood that such description has been given by way of illustration and example and not by way of limitation, reference for the latter purpose being had to the appended claims.

We claim:

1. A core sample cell for use in the measurement of the electrical resistivity of core samples comprising in combination an enclosed box having side walls, a bottom wall, and a cover, a pair of spring-loaded electrodes entering said box through two opposite side walls and provided with core sample contacting plates, a pair of electrode holders mounted within said box and shaped to form a channel adapted to receive a core sample, and a plurality of spring-loaded electrodes carried by said electrode holders adapted to contact a core sample received within said channel at the longitudinal surface of said core sample.

2. A core sample cell for use in the measurement of the electrical resistivity of core samples comprising in combination an enclosed box having side walls, a bottom wall, and a cover, a pair of spring-loaded electrodes entering said box through two opposite side walls and provided with core sample contacting plates, a pair of electrode holders mounted on a wall of said box and shaped to form a channel adapted to receive a core sample, a corresponding pair of electrode holders mounted on said cover of said box and shaped to form a channel adapted to receive a core sample, a plurality of spring-loaded electrodes carried by said electrode holders adapted to contact a core sample received within said channel of said pairs of electrode holders at the longitudinal surface of said core sample, and means for electrically connecting each of said electrode holders mounted on a well of said box with one each of said electrode holders mounted on said cover of said box.

3. A core sample cell for use in the measurement of the electrical resistivity of core samples comprising in combination an enclosed box having side walls, a bottom wall, and a cover, a pair of spring-loaded electrodes entering said box through two opposite side walls and provided with core sample contacting plates, a pair of electrode holders mounted on a wall of said box and shaped to form a channel having a semi-circular cross-section, a pair of electrode holders mounted on said cover of said box and shaped to form a channel having a semi-circular cross-section, a plurality of spring-loaded electrodes carried by each of said electrode holders and extending radially therefrom within said channel, said electrodes carried by each of said first mentioned pair of electrode holders being in the same planes as said electrodes carried by each of said second mentioned pair of electrode holders, and means for electrically contacting each of said first mentioned pair of electrode holders with one each of said second mentioned pair of electrode holders.

4. A core sample cell for use in the measurement of the electrical resistivity of core samples comprising in combination an enclosed box having side walls, a bottom wall, and a cover, said box providing a chamber for holding a body of fluid, a pair of spring-loaded electrodes entering said box through two opposite side walls and provided with core sample contacting plates, a pair of electrode holders mounted on a wall of said box and shaped to form a channel having a semi-circular cross-section, a pair of electrode holders mounted on said cover of said box and shaped to form a channel having a semi-circular cross-section, a plurality of spring-loaded electrodes carried by each of said electrode holders and extending radially therefrom within said channel, said electrodes carried by each of said first mentioned pair of electrode holders being in the same planes as said electrodes carried by each of said second mentioned pair of electrode holders, means for electrically contacting each of said first mentioned electrode holders with one each of said second mentioned electrode holders, and electrical conductors leading through one wall of said box and contacting each of said pair of said spring-loaded electrodes and each of said first mentioned pair of electrode holders.

5. A core sample cell for use in the measurement of the electrical resistivity of core samples comprising in combination an enclosed box having side walls, a bottom wall, and a cover, a pair of spring-loaded electrodes entering said box through opposite side walls and provided with core sample contacting plates, two pairs of oppositely positioned electrode holders mounted within said box, and a plurality of spring-loaded electrodes carried by said two pairs of electrode holders adapted to contact a core sample at the longitudinal surface of said core sample.

6. A core sample cell for use in the measurement of the electrical resistivity of core samples comprising in combination an enclosed box having side walls, a bottom wall, and a cover, a pair of spring-loaded electrodes entering said box through opposite side walls and provided with core sample contacting plates, two pairs of oppositely positioned electrode holders mounted within said box, and a plurality of spring-loaded electrodes carried by and radially extending from said two pairs of electrode holders adapted to contact and support a core sample along the longitudinal surface of said core sample.

7. A core sample cell for use in the measurement of the electrical resistivity of core samples comprising in combination an enclosed box having side walls, a bottom wall, and a cover, a pair of spring-loaded electrodes entering said box through two opposite side walls and provided with core sample contacting plates, a pair of electrode holders mounted on a wall of said box, a pair of electrode holders mounted on said cover of said box, a plurality of spring-loaded electrodes carried by each of said electrode holders and extending radially therefrom, said electrodes carried by each of said first mentioned pair of electrode holders being in the same planes as said electrodes carried by each of said second mentioned pair of electrode holders, means for electrically contacting each of said first mentioned electrode holders with one each of said second mentioned electrode holders, and electrical conductors leading through one wall of said box and contacting one each of said pair of spring-loaded electrodes and one each of either pair of electrode holders.

References Cited in the file of this patent

UNITED STATES PATENTS

| | | |
|---|---|---|
| 1,893,700 | Enlund | Jan. 10, 1933 |
| 1,895,643 | Putnam | Jan. 31, 1933 |
| 2,195,504 | Stone | Apr. 2, 1940 |
| 2,539,355 | Reichertz | Jan. 23, 1951 |
| 2,613,250 | Bilhartz et al. | Oct. 7, 1952 |